United States Patent
Kim et al.

(10) Patent No.: US 10,401,637 B2
(45) Date of Patent: Sep. 3, 2019

(54) MICRO MIRROR ARRAY, MANUFACTURING METHOD OF THE MICRO MIRROR ARRAY, AND FLOATING DISPLAY DEVICE INCLUDING THE MICRO MIRROR ARRAY

(71) Applicant: LG ELECTRONICS INC., Seoul (KR)

(72) Inventors: Wootae Kim, Seoul (KR); Jinbeom Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 329 days.

(21) Appl. No.: 15/205,754

(22) Filed: Jul. 8, 2016

(65) Prior Publication Data

US 2017/0017089 A1 Jan. 19, 2017

(30) Foreign Application Priority Data

Jul. 17, 2015 (KR) .......................... 10-2015-0101808
Nov. 25, 2015 (KR) .......................... 10-2015-0165220

(51) Int. Cl.
*G02B 5/136* (2006.01)
*G02B 27/22* (2018.01)
*B29D 11/00* (2006.01)
*G02B 17/00* (2006.01)
*G02B 5/124* (2006.01)

(52) U.S. Cl.
CPC .... *G02B 27/2292* (2013.01); *B29D 11/00596* (2013.01); *G02B 5/124* (2013.01); *G02B 17/002* (2013.01); *G02B 17/006* (2013.01); *B29D 11/00865* (2013.01); *B29D 11/00932* (2013.01); *G02B 5/136* (2013.01)

(58) Field of Classification Search
CPC .... G02B 5/08; G02B 5/0833; G02B 27/2292; G02B 5/124; G02B 17/002; G02B 17/006; G02B 5/136; B29D 11/00596; B29D 11/00865; B29D 11/00932
USPC ........................................................ 359/546
See application file for complete search history.

(56) References Cited

U.S. PATENT DOCUMENTS

| | | | | |
|---|---|---|---|---|
| 6,862,127 B1 * | 3/2005 | Ishii | ...................... | B81B 3/0035 359/223.1 |
| 9,494,716 B2 * | 11/2016 | Juni | ........................ | G02B 5/08 |
| 2006/0181762 A1 | 8/2006 | Nam et al. | | |

(Continued)

FOREIGN PATENT DOCUMENTS

| CN | 1821829 A | 8/2006 |
|---|---|---|
| CN | 101405627 A | 4/2009 |

(Continued)

*Primary Examiner* — Euncha P Cherry
(74) *Attorney, Agent, or Firm* — Birch, Stewart, Kolasch & Birch, LLP

(57) ABSTRACT

Discussed is a manufacturing method of a micro mirror array including forming a mirror surface on a polymer film, bonding a plurality of polymer films, each having the mirror surface formed thereon, cutting the bonded polymer films to manufacture a primary micro mirror array, forming an additional mirror surface on the manufactured primary micro mirror array, bonding a plurality of primary micro mirror arrays, each having the additional mirror surface formed thereon, and cutting the bonded primary micro mirror arrays. The micro mirror array is used to form a high-quality floating image.

20 Claims, 24 Drawing Sheets

(56) References Cited

U.S. PATENT DOCUMENTS

| | | |
|---|---|---|
| 2010/0231860 A1 | 9/2010 | Maekawa |
| 2010/0255426 A1* | 10/2010 | Jain ...................... G02B 5/0833 359/291 |
| 2011/0181949 A1 | 7/2011 | Hashikawa |
| 2014/0253880 A1 | 9/2014 | Yoneno |
| 2015/0192709 A1 | 7/2015 | Juni |

FOREIGN PATENT DOCUMENTS

| | | |
|---|---|---|
| CN | 102955256 A | 3/2013 |
| CN | 104428697 A | 3/2015 |
| CN | 104615312 A | 5/2015 |
| JP | 2011-81300 A | 4/2011 |
| JP | 2014-32394 A | 2/2014 |
| KR | 10-060199 B1 | 7/2006 |
| KR | 10-2009-0008265 A | 1/2009 |

* cited by examiner (a)

(b)

(c)

1400

1270

1500

1270

MICRO MIRROR ARRAY, MANUFACTURING METHOD OF THE MICRO MIRROR ARRAY, AND FLOATING DISPLAY DEVICE INCLUDING THE MICRO MIRROR ARRAY

CROSS-REFERENCE TO RELATED APPLICATION

This application claims the priority benefit of Korean Patent Application No. 10-2015-0101808, filed on Jul. 17, 2015 and Korean Patent Application No. 10-2015-0165220 filed on Nov. 25, 2015 in the Korean Intellectual Property Office, which are all incorporated herein by reference.

BACKGROUND OF THE INVENTION

1. Field of the Invention

Embodiments of the present invention relate to a micro mirror array, a manufacturing method of the micro mirror array, and a floating display device including the micro mirror array.

2. Description of the Related Art

As a result of the growth of the information society, the demand for various display devices has increased along with the increase in the amount of multimedia content.

In addition, research has been increasingly conducted into a digital signage, in which display devices are used outdoors for marketing, advertisements, broadcasting, the provision of information, etc.

Meanwhile, research has also been increasingly conducted into a pseudo hologram, exhibiting similar effects to a hologram, which enables a user to view a three-dimensional (3D) image using a semitransparent screen and a multi-viewpoint image.

A half mirror system has been proposed as one type of the pseudo hologram.

FIG. 1 is a view schematically showing an example of a half mirror type display device, which is applied to a performance stage.

Referring to FIG. 1, the half mirror type display device provides a stereoscopic image using a half mirror that transmits some of the light and reflects some of the light.

The half mirror, which is disposed at an angle of 45 degrees, reflects an image displayed on a display unit such that a user perceives a virtual image formed behind the half mirror as if the virtual image were displayed in front of the half mirror.

However, the image formed by the half mirror type display device is a rear floating image, which cannot interact with the user and exhibits a low cubic or 3D effect. For these reasons, the half mirror type display device is only applicable in limited places, such as performance stages.

In addition, the virtual image is formed behind the half mirror. As a result, the virtual image is not realistic. Furthermore, it is necessary to increase the distance between the half mirror type display device and the rear of a stage in order to improve a cubic or 3D effect.

SUMMARY OF THE INVENTION

Therefore, the present invention has been made in view of the above problems, and it is an object of the present invention to provide a floating display device that is capable of displaying an image that is highly realistic and exhibits a high cubic or 3D effect, a micro mirror array used in the floating display device, and a manufacturing method of the micro mirror array.

It is another object of the present invention to provide a floating display device that is capable of interacting with a user, a micro mirror array used in the floating display device, and a manufacturing method of the micro mirror array.

In accordance with an aspect of the present invention, the above and other objects can be accomplished by the provision of a manufacturing method of a micro mirror array including forming a mirror surface on a polymer film, bonding a plurality of polymer films, each having the mirror surface formed thereon, cutting the bonded polymer films to manufacture a primary micro mirror array, forming an additional mirror surface on the manufactured primary micro mirror array, bonding a plurality of primary micro mirror arrays, each having the additional mirror surface formed thereon, and cutting the bonded primary micro mirror arrays.

In accordance with another aspect of the present invention, there is provided a micro mirror array including a polymer film part and a plurality of mirror surfaces formed in one layer of the polymer film part, wherein the mirror surfaces are arranged in a lattice arrangement.

In accordance with a further aspect of the present invention, there is provided a floating display device including a display unit for displaying an image and a micro mirror array for reflecting an original image displayed on the display unit to form a floating image on a virtual surface that is located symmetrically with the display unit on the basis of the micro mirror array, wherein the micro mirror array includes a polymer film part and a plurality of mirror surfaces formed in one layer of the polymer film part.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EMBODIMENTS

Figure 1:
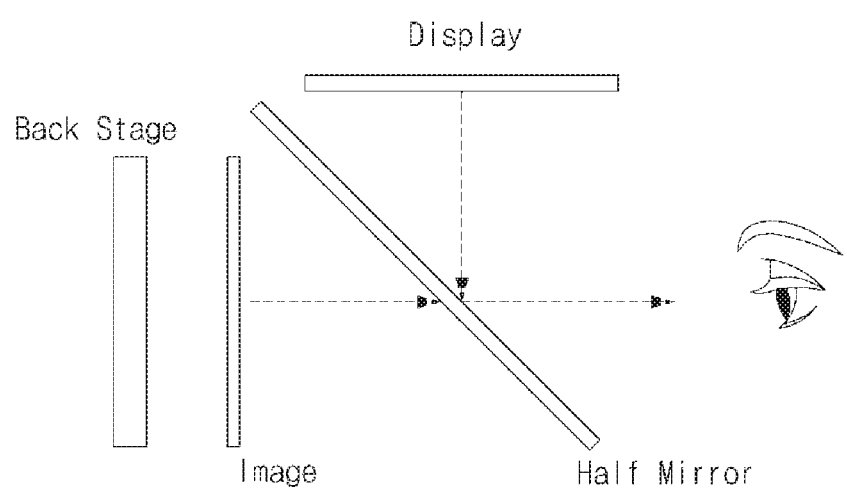
FIG. 1 is a view schematically showing an example of a half mirror type display device.

Advantages, features and methods for achieving those of embodiments may become apparent upon referring to embodiments described later in detail together with attached drawings. However, embodiments are not limited to the embodiments disclosed hereinafter, but may be embodied in different modes.

In the drawings, parts that are irrelevant to embodiments are omitted for convenience of description and clarity. The embodiments are provided for perfection of disclosure and informing a scope to persons skilled in this field of art. The same reference numbers may refer to the same elements throughout the specification.

Figure 2:
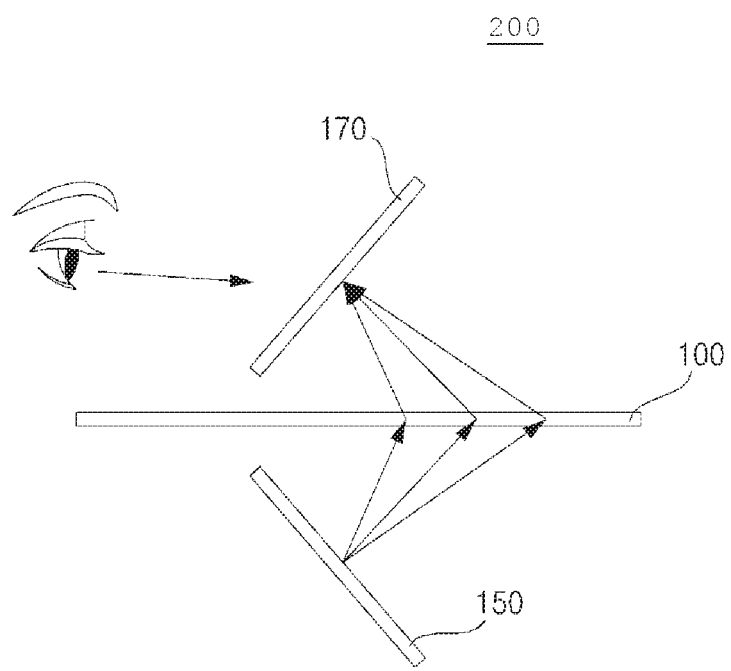
FIG. 2 is a conceptual view showing a floating display device according to an embodiment of the present invention.

FIG. 2 is a conceptual view showing a floating display device according to an embodiment of the present invention.

Referring to FIG. 2, a floating display device 200 according to an embodiment of the present invention may include a display unit 150 for displaying an image and a micro mirror array 100 for reflecting the image displayed on the display unit 150 in a direction opposite to a direction in which the display unit 150 is disposed.

The floating display device according to the embodiment of the present invention may be a table-top display device.

Unlike a general display device, which is disposed perpendicular to the floor surface or the ground, the table-top display device may be disposed parallel to the floor surface or the ground so as to form an image in an upward direction of the table.

In addition, the micro mirror array 100 according to the embodiment of the present invention may be disposed parallel to the floor surface or the ground.

The micro mirror array 100 may reflect an image displayed on the display unit 150, which is disposed under the micro mirror array 100, in a direction opposite to a direction in which the display unit 150 is disposed, i.e. upward, to form a floating image 170.

In addition, the micro mirror array 100 may reflect the original image displayed on the display unit 150 to form the floating image 170 on a virtual surface that is located symmetrically with the display unit 150 on the basis of the micro mirror array 100.

The half mirror, which has been previously described with reference to FIG. 1, forms a rear floating image, which cannot interact with a user, and exhibits a low cubic or 3D effect. For these reasons, the half mirror is applicable only in limited situations.

In the floating display device according to the embodiment of the present invention, however, a real image is formed in space. As a result, the image is highly realistic, and exhibits a high cubic or 3D effect even though the image is two-dimensional (2D). In addition, the image is a front floating image, which may interact with the user.

Consequently, the floating display device according to the embodiment of the present invention may be applied to a digital signage, a table-top display, etc.

Figure 3:
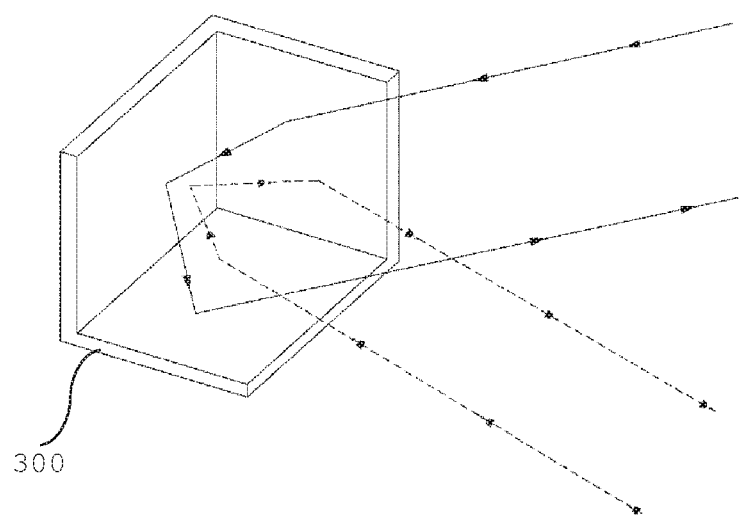
FIGS. 3 and 4 are reference views illustrating the floating display device.
Figure 4:
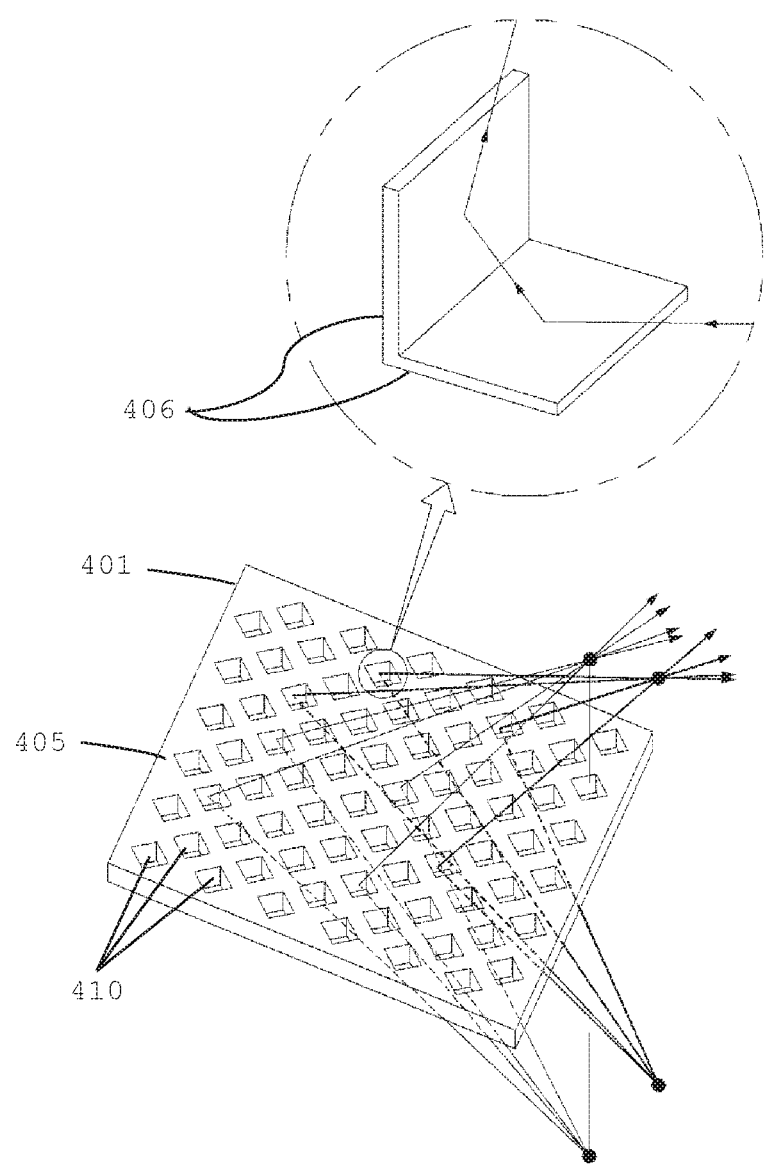

FIGS. 3 and 4 are reference views illustrating the floating display device.

Specifically, FIG. 3 is a reference view illustrating a retro-reflective principle, one of the principles used for the floating display device.

Referring to FIG. 3, light, incident upon an optical element 300, such as a micro cube, is reflected by three surfaces, and then returns to the original position, from which the light was emitted. This phenomenon is called retro-reflection.

Retro-reflection is a technology used for a retro-reflective plate, which reflects light emitted from a headlamp of a vehicle at night in order to identify a traffic sign without additional illumination.

The floating display device may use a retro-reflection phenomenon to form an image in space based on an optical element, such as a micro mirror array.

Particularly, in an instance in which the floating display device is configured using the properties of the mirror, as in the embodiment of the present invention, image quality is high since no lens or a mirror is used. In addition, the floating display device according to the embodiment of the present invention may be easily used as a table-top display device, and 1:1 image matching is possible.

Conventionally, quadrangular holes are formed through a wafer, and mirror surfaces are formed at the wall surfaces of the holes. Alternatively, a thin glass mirror is cut so as to have a very small width, and then the cut portions of the thin glass mirror are bonded to constitute a micro mirror array, which is necessary in order to form a floating image.

FIG. 4 is a view showing a micro-hole type micro mirror array.

As shown in FIG. 4, micro holes 405 are formed through a wafer 401, and mirror surfaces 406 are formed at the wall surfaces of the micro holes 405 to constitute a micro mirror array 410. In an instance in which the micro mirror array, which uses two reflective surfaces, as shown in FIG. 4, is used in place of the micro cube, which uses three reflective surfaces, an image may be formed such that the formed image and the original image are symmetrical with each other on the basis of the micro mirror array. As a result, the image may float in empty space.

In the micro-hole type micro mirror array shown in FIG. 4, it is necessary to form a plurality of quadrangular micro holes each having a size of several hundreds of um in consideration of the resolution of an image to be formed.

In this instance, it is also necessary to form a mirror surface that is capable of forming a clean image in each hole. However, it is very difficult to form a mirror surface having such high quality.

In addition, the micro-hole type micro mirror array has been manufactured using various semiconductor processes. However, the yield of the micro-hole type micro mirror array is very low, and it is not possible to increase the size of the micro-hole type micro mirror array or to reduce the cost of manufacturing the micro-hole type micro mirror array.

In addition, in order to stably form the micro holes, it is necessary to provide a predetermined distance between neighboring ones of the micro holes. For example, it is necessary to provide a distance that is almost equal to the size of each of the micro holes between neighboring ones of the micro holes. As a result, regions in which the mirror surfaces are not formed may exist between the micro holes. If light is reflected from the regions in which the mirror surfaces are not formed, light is lost with the result that light efficiency is reduced.

Figure 5A:
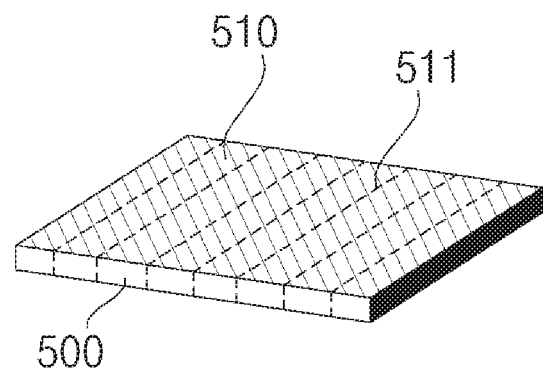
FIGS. 5A to 5C are reference views illustrating a manufacturing method of a two-layer type micro mirror array.
Figure 5B:
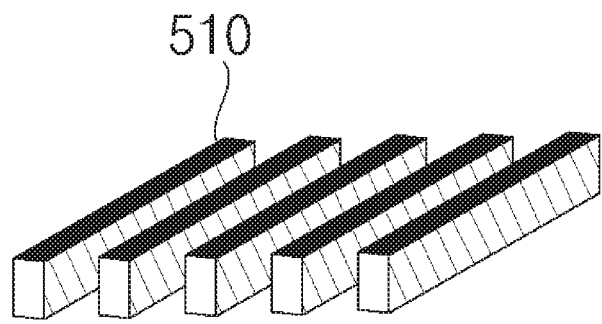
Figure 5C:
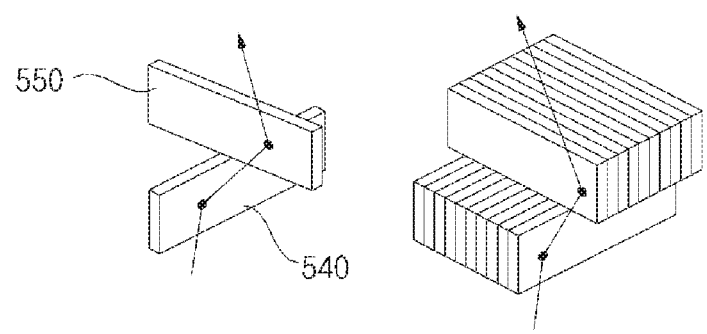

FIGS. 5A to 5C are reference views illustrating a method of manufacturing a two-layer type micro mirror array by cutting a thin glass mirror so as to have a very small width and then bonding the cut portions of the thin glass mirror.

Referring to FIG. 5A, glass 500 having a thickness of several hundreds of um is coated with aluminum Al to form a mirror surface 510 on the glass 500, and then the glass 500 is cut along cutting lines 511 so as to have a width of several hundreds of um.

Subsequently, as shown in FIG. 5B, the cut portions of the glass 500 are rotated by 90 degrees, and are then attached to constitute a plate. That is, the cut portions of the glass 500 are bonded to constitute a plate.

Subsequently, as shown in FIG. 5C, two plates 540 and 550 are arranged such that the plates 540 and 550 intersect at right angles to constitute a two-layer type micro mirror array.

The two-layer type micro mirror array may provide the same effect as the micro-hole type micro mirror array shown in FIG. 4.

The two-layer type micro mirror array may be manufactured at higher yield than the micro-hole type micro mirror array shown. However, the yield of the two-layer type micro mirror array is still too low to achieve mass production, and it is not possible to increase the size of the two-layer type micro mirror array or to reduce the cost of manufacturing the two-layer type micro mirror array.

Furthermore, because the two plates 540 and 550 are used, even more light is lost, with the result that light efficiency is reduced by half or more.

For example, in an instance in which the first layer plate 540 has a mirror surface formed in a first direction, and light is incident upon a part of the first layer plate 540 at which the mirror surface is not formed, the light is not reflected by the mirror surface of the first layer plate 540.

In addition, in an instance in which the second layer plate 550 has a mirror surface formed in a second direction, and light is incident upon a part of the second layer plate 550 at which the mirror surface is not formed, the light is not reflected by the mirror surface of the second layer plate 550.

In the two-layer type micro mirror array, in which the two plates 540 and 550 are arranged such that the plates 540 and 550 intersect at right angles, therefore, light may not be reflected by the mirror surfaces of the plates 540 and 550. As a result, light efficiency may be reduced.

The present invention relates to the formation of a mirror type floating image. To this end, the present invention proposes a micro mirror array that has high yield, is configured to have a large size, and is manufactured at low cost.

Figure 6:
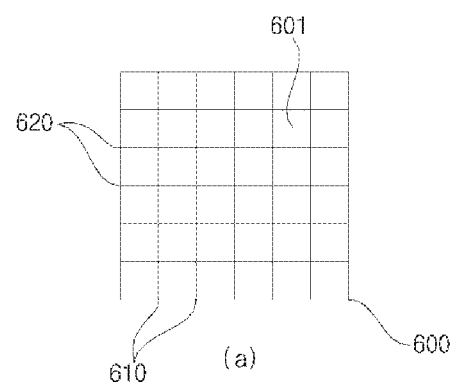
FIG. 6 is a view showing a micro mirror array according to an embodiment of the present invention.
Figure 6:
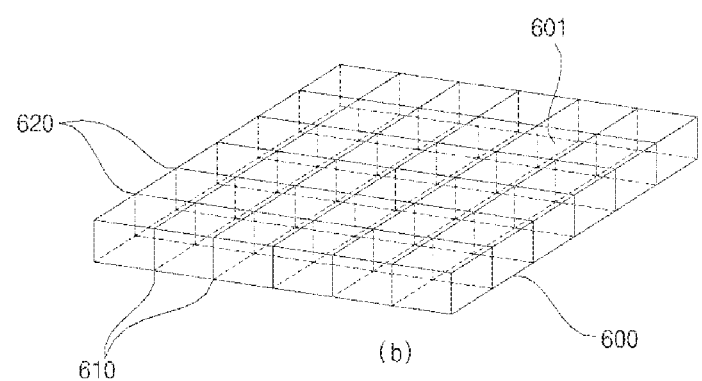
Figure 6:
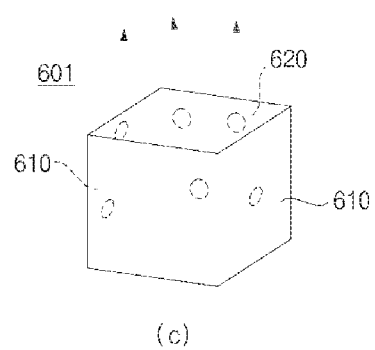

FIG. 6 is a view showing a micro mirror array according to an embodiment of the present invention.

Referring to (a) and (b) of FIG. 6, the micro mirror array according to the embodiment of the present invention may include a polymer film part 600 and a plurality of mirror surfaces 610 and 620 formed at one layer of the polymer film part 600. The mirror surfaces 610 and 620 may be arranged in a lattice arrangement.

Meanwhile, the mirror surfaces 610 and 620 may be formed in one layer of the polymer film part 600.

In other embodiments, the mirror surfaces 610 and 620 may include first surfaces 610 and second surfaces 620 that are formed at right angles to each other.

In addition, the micro mirror array may include a plurality of first surfaces 610 formed parallel to one another.

In addition, the micro mirror array may include a plurality of second surfaces 620 formed parallel to one another.

As shown in (a) of FIG. 6, therefore, the lattice arrangement may be constituted by a plurality of quadrangles.

Meanwhile, the polymer film part 600 may be made of any one selected from among polycarbonate (PC), polyethylene (PE), polyethylene terephthalate (PET), polypropylene (PP), and polymethyl methacrylate (PMMA). Alternatively, the polymer film part 600 may be made of any transparent polymer film.

Meanwhile, the polymer film part 600 may be formed to have a single layer. That is, the polymer film part 600 may be formed to have a single layer, and the mirror surfaces may be formed over the single layer of the polymer film part 600.

Referring to (a) to (c) of FIG. 6, the micro mirror array may be divided into a plurality of unit regions 601 by the first surfaces 610 and the second surfaces 620.

Each of the unit regions 601 may have side surfaces defined by two first surfaces 610 and two second surfaces 620.

As shown in (b) of FIG. 6, therefore, light incident upon one of the first surfaces 610 may be reflected to one of the second surfaces 620, from which the light may be reflected again.

Alternatively, light incident upon one of the second surfaces 620 may be reflected to one of the first surfaces 610, from which the light may be reflected again.

In each of the unit regions 601, therefore, all of the four mirror surfaces 610 and 620 may be mirror surfaces that first reflect light or mirror surfaces that second reflect the light, whereby light efficiency is improved.

That is, when light emitted from the display unit 150 is incident upon one of the two first surfaces 610 or one of the two second surfaces 620, the light may be reflected to the other of the two second surfaces 620 or the other of the two first surfaces 610.

The light, incident upon the other of the two second surfaces 620 or the other of the two first surfaces 610, may be reflected to the outside of the micro mirror array.

Consequently, in order to form a floating image, the micro mirror array may reflect the light in a direction opposite to a direction in which the display unit 150 is disposed.

That is, it is possible to form an image such that the formed image and the original image are symmetrical with each other on the basis of the micro mirror array using two reflections from the two surfaces 610 and 620. As a result, it is possible to float the image in empty space. In addition, it is possible to completely use all regions of the micro mirror array. Furthermore, only a single layer is used, thereby improving light efficiency.

In the micro-hole type micro mirror array of FIG. 4, it is necessary to provide a predetermined distance between neighboring ones of the micro holes in order to stably form the micro holes.

As a result, unavailable regions exist in the micro-hole type micro mirror array, and light incident upon the unavailable regions of the micro-hole type micro mirror array is not reflected, and is ultimately lost.

In addition, in the two-layer type micro mirror array of FIG. 5, the two plates are used to constitute two layers. As a result, light efficiency is reduced.

For example, in an instance in which the first layer plate has a mirror surface formed in a first direction, and light is incident upon a part of the first layer plate at which the mirror surface is not formed, the light is not reflected by the mirror surface of the first layer plate, and is ultimately lost.

In addition, in an instance in which the second layer plate has a mirror surface formed in a second direction, and light is incident upon a part of the second layer plate at which the mirror surface is not formed, the light is not reflected by the mirror surface of the second layer plate, and is ultimately lost.

In the micro mirror array according to the embodiment of the present invention, however, all regions of the micro mirror array are used without wasted regions of the micro mirror array attributable to the distance between neighboring ones of the micro holes unlike the micro-hole type micro mirror array of FIG. 4. In addition, only the single layer is used. Consequently, the micro mirror array according to the embodiment of the present invention may have light efficiency equivalent to about two and four times those of the micro-hole type micro mirror array of FIG. 4 and the two-layer type micro mirror array of FIG. 5, respectively.

Figure 7:
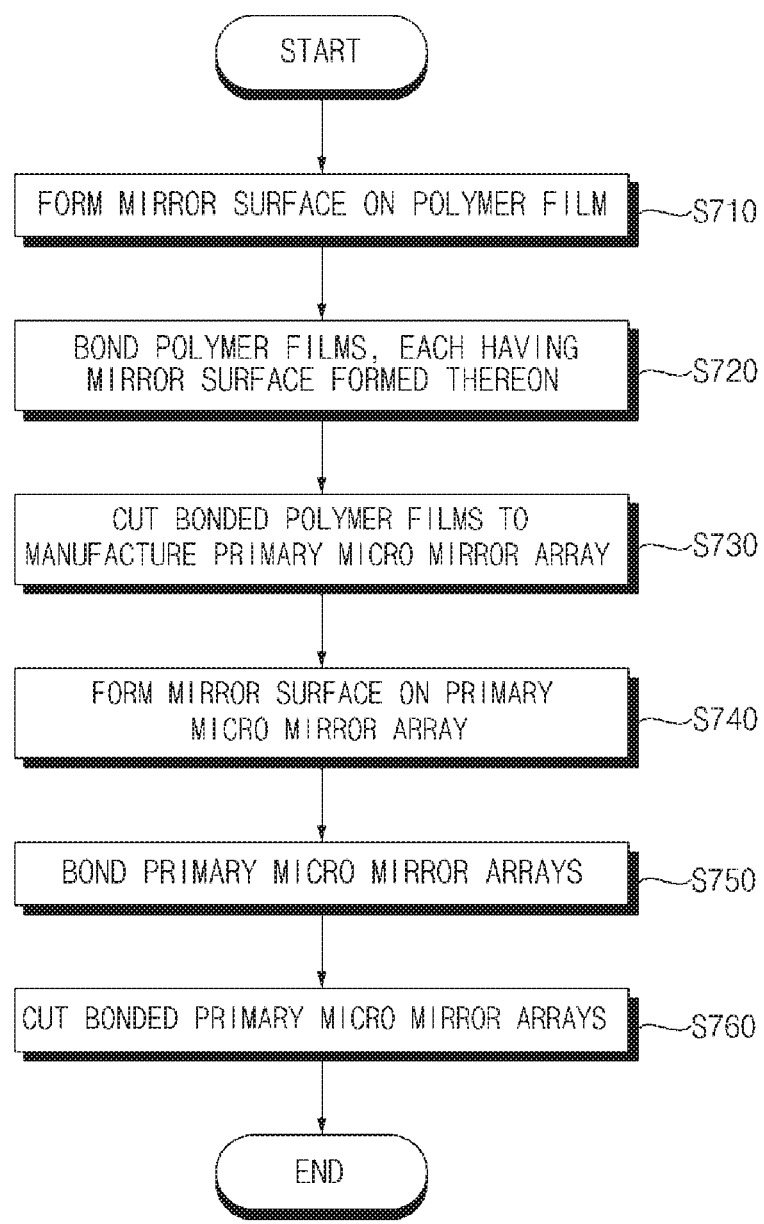
FIG. 7 is a flowchart showing a manufacturing method of a micro mirror array according to an embodiment of the present invention.

FIG. 7 is a flowchart showing a manufacturing method of a micro mirror array according to an embodiment of the present invention.

FIGS. 8A to 12D are reference views illustrating manufacturing methods of micro mirror arrays according to various embodiments of the present invention.

Figure 8A:
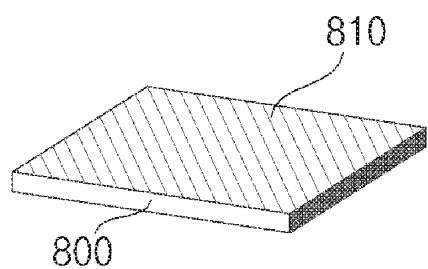
FIGS. 8A to 12D are reference views illustrating manufacturing methods of micro mirror arrays according to various embodiments of the present invention.

Referring to these figures, first, as shown in FIG. 8A, a mirror surface 810 may be formed on a polymer film 800 (S710).

The polymer film may be any one selected from among polycarbonate (PC), polyethylene (PE), polyethylene terephthalate (PET), polypropylene (PP), and polymethyl methacrylate (PMMA). Alternatively, the polymer film may be any transparent polymer film.

In addition, at the step (S710) of forming the mirror surface, the polymer film 800 may be coated with a metal material to form the mirror surface 810.

The metal material may exhibit high reflexibility. For example, the metal material may be any one selected from among aluminum, lead, silver, zinc, and tin.

Figure 8B:
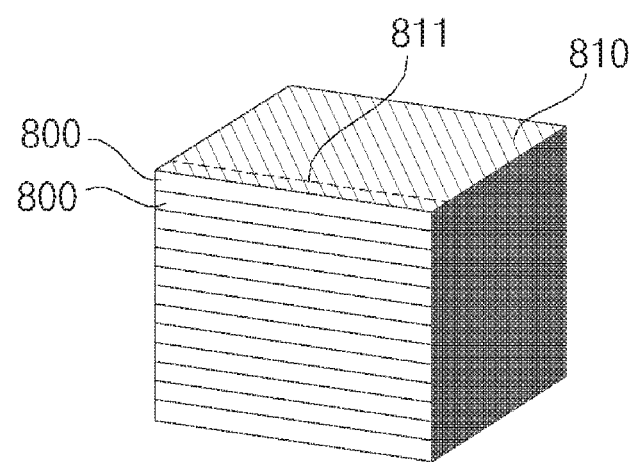

Referring to FIG. 8B, a plurality of polymer films 800, each of which has a mirror surface 810 formed thereon, may be bonded (S720). For example, a plurality of polymer films 800, each of which is coated with aluminum (Al), may be bonded in a stacked state.

Meanwhile, the polymer films 800, each of which has a mirror surface 810 formed thereon may be bonded by optical bonding.

During bonding, air gaps may be generated between the respective polymer films 800. The air gaps may reflect incident light, whereby the optical properties of the light may be lost or distorted.

For this reason, the polymer films 800 are bonded by optical bonding in order to prevent the loss of light or distortion in optical properties thereof, which may be caused during bonding.

In the present invention, various optical bonding methods which are being studied may be used. In an example, an optical bonding resin may be applied to one polymer film 800, a pattern may be formed on the optical bonding resin, the optical bonding resin may be cured using ultraviolet light or heat, and the polymer film 800 may be bonded to another polymer film.

Referring to FIGS. 9A to 9D and 10A, the bonded polymer films 800 may be cut to manufacture a primary micro mirror array 1000 (S730).

In the present invention, the bonded polymer films 800 may be cut using various methods in order to form various mirror surfaces of the micro mirror array.

Figure 9A:
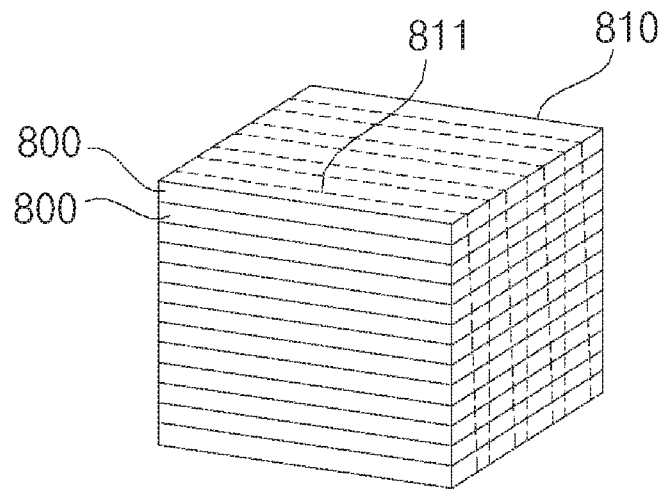

Referring to FIG. 9A, first cutting may be performed obliquely at a predetermined angle of inclination, and second cutting may be performed perpendicularly. The oblique and perpendicular cutting processes may be repeatedly performed.

Alternatively, the first cutting may be performed perpendicularly, and the second cutting may be performed obliquely. The perpendicular and oblique cutting processes may be repeatedly performed.

Figure 9B:
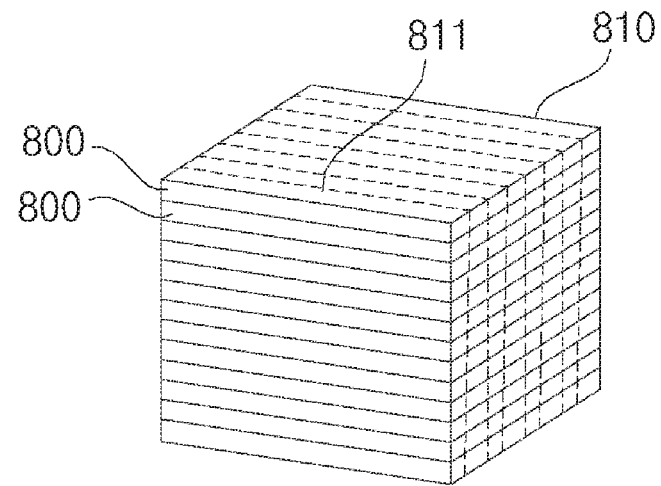

Alternatively, as shown in FIG. 9B, the bonded polymer films 800 may be cut in a direction of inclination different from a direction of inclination shown in FIG. 9A.

Figure 9C:
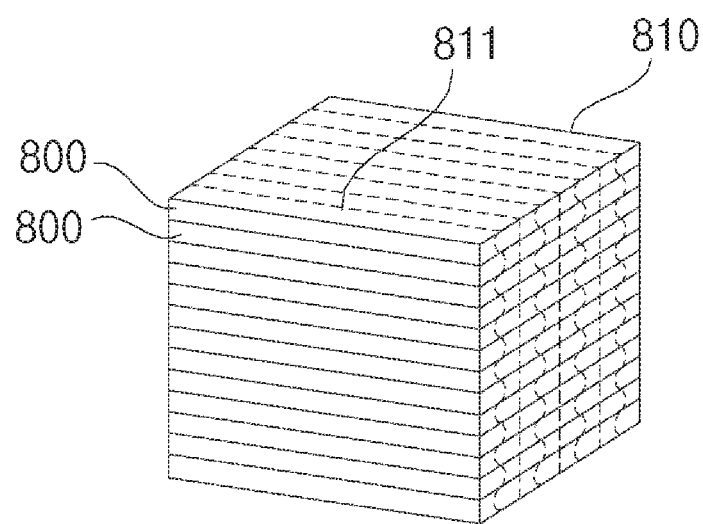
Figure 9D:
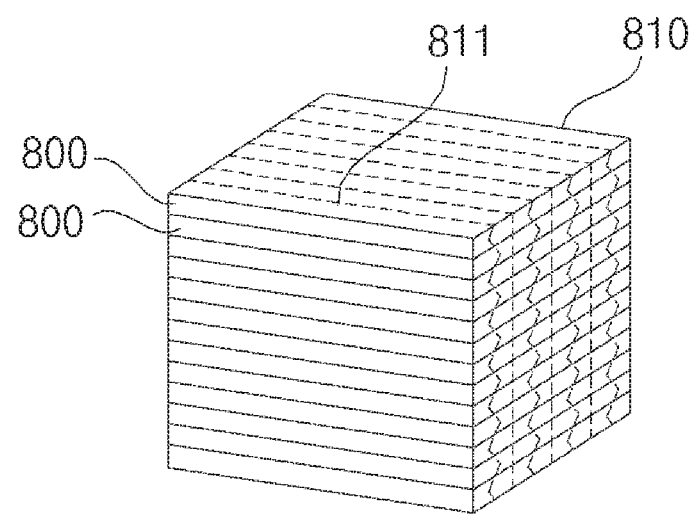

Alternatively, as shown in FIG. 9C, the bonded polymer films 800 may be cut at least once to have a wave shape, or, as shown in FIG. 9D, the bonded polymer films 800 may be cut at least once to have a mountain form.

The bonded polymer films may be cut using various methods shown in FIGS. 9A to 9D to form mirror surfaces of the micro mirror array, which are necessary to constitute the floating display device.

Figure 10A:
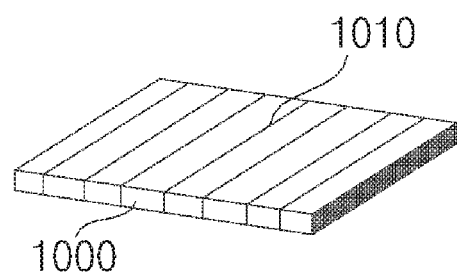

In one example, as shown in FIG. 10A, the bonded polymer films 800 may be cut perpendicularly along cutting lines 811 to manufacture a primary micro mirror array 1000. In an instance in which primary micro mirror arrays 1000 are manufactured by repetitive perpendicular cutting, all of the manufactured primary micro mirror arrays 1000 may have the same shape.

At this time, each of the primary micro mirror arrays 1000 may include a stripe type mirror surface 1010 formed in the polymer film.

Figure 10B:
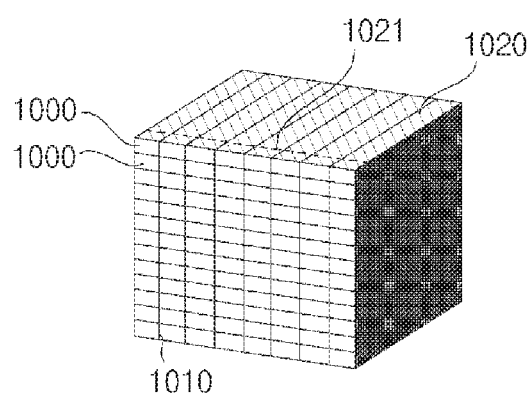

Meanwhile, as shown in FIG. 10B, an additional mirror surface 1020 may be formed at each of the manufactured primary micro mirror arrays 1000 (S740). For example, the additional mirror surface 1020 may be formed on a perpendicularly cut surface of each of the primary micro mirror arrays 1000, which is cut along a corresponding one of the cutting lines 811, or on a surface of each of the primary micro mirror arrays 1000 that is opposite to the perpendicularly cut surface.

Meanwhile, the primary micro mirror arrays 1000, each of which has the additional mirror surface 1020, may be bonded (S750).

For example, one surface of each of the primary micro mirror arrays 1000 may be coated with aluminum (Al), and then the primary micro mirror arrays 1000, which are coated with aluminum (Al), may be bonded in a stacked state.

Even in this instance, the primary micro mirror arrays 1000, each of which has the additional mirror surface 1020, may be bonded by optical bonding. Referring to FIG. 10B, the bonded primary micro mirror arrays 1000 may be cut along cutting lines 1021 to finally manufacture a micro mirror array (S760).

In one example, the bonded primary micro mirror arrays 1000 may be cut perpendicularly along the cutting lines 1021 to finally manufacture a micro mirror array.

Meanwhile, even in this instance, various cutting methods shown in FIGS. 11A to 11D may be used. As described previously with reference to FIGS. 9A to 9D, the bonded primary micro mirror arrays may be cut using various cutting methods to form mirror surfaces of the micro mirror array, which are necessary to constitute the floating display device.

Meanwhile, mirror surfaces and additional mirror surfaces of the micro mirror array may be formed using the various cutting methods described with reference to FIGS. 9A to 9D and FIGS. 11A to 11D.

Figure 11A:
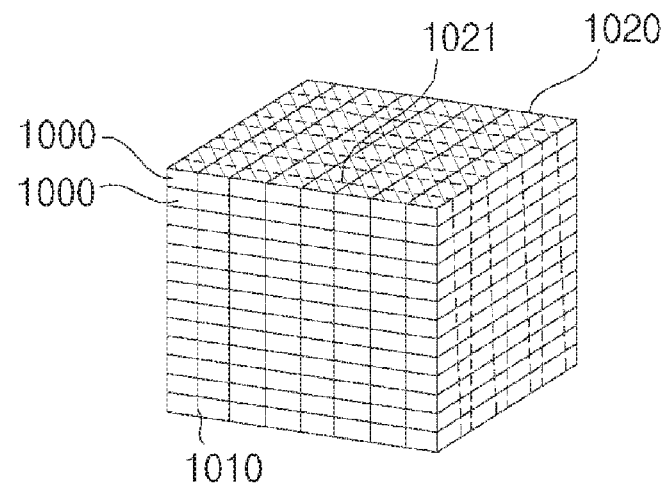
Figure 11B:
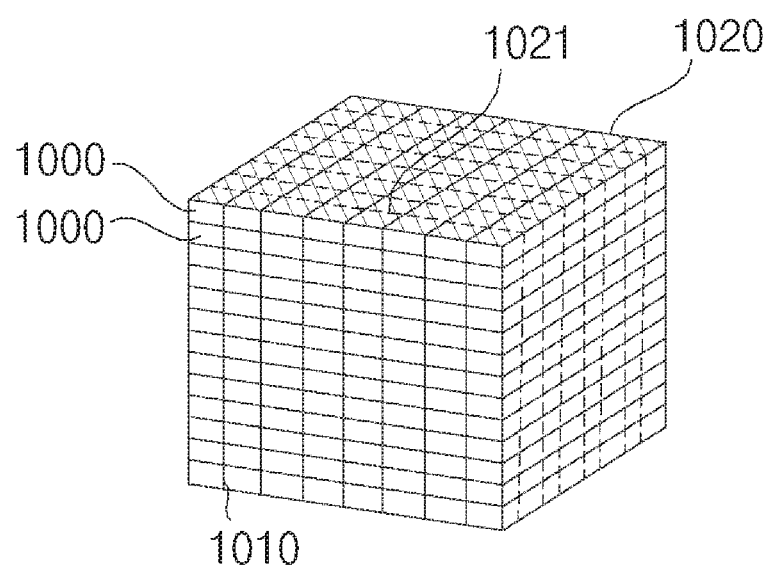
Figure 11C:
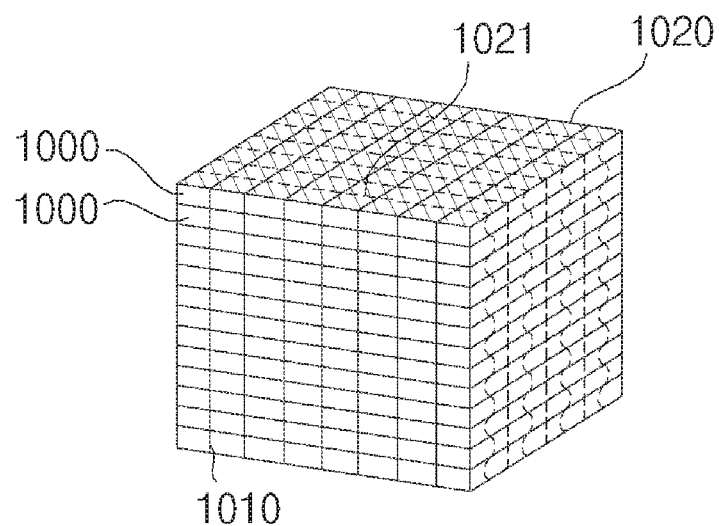
Figure 11D:
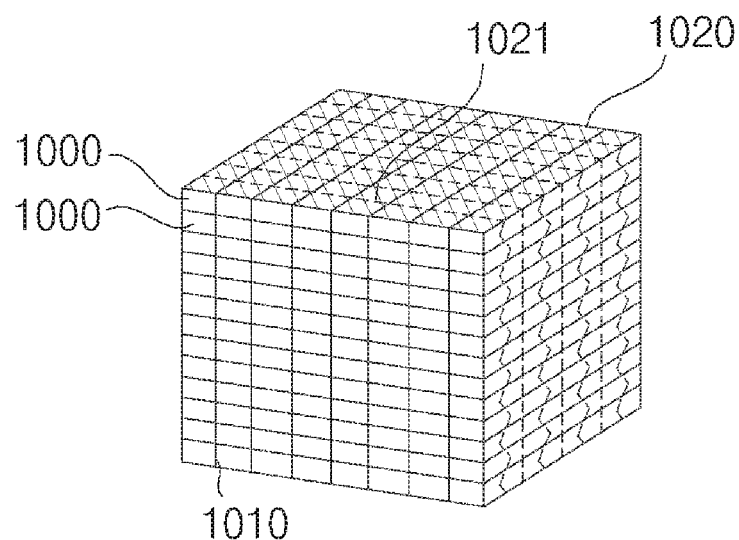

As described with reference to FIGS. 9A and 11A, first cutting may be performed obliquely at a predetermined angle of inclination, and second cutting may be performed perpendicularly. The oblique and perpendicular cutting processes may be repeatedly performed.

Figure 12A:
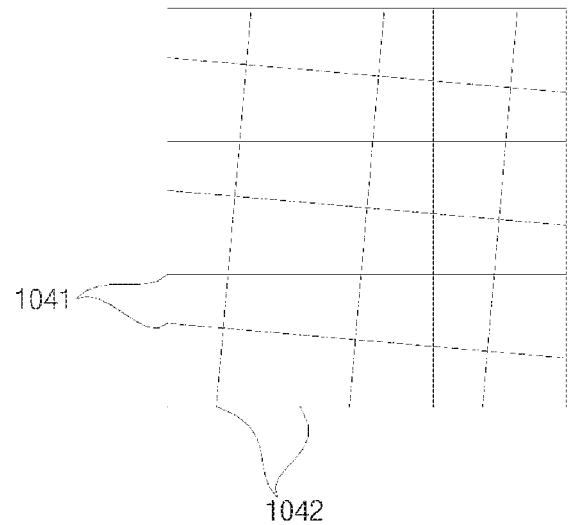
Figure 12B:
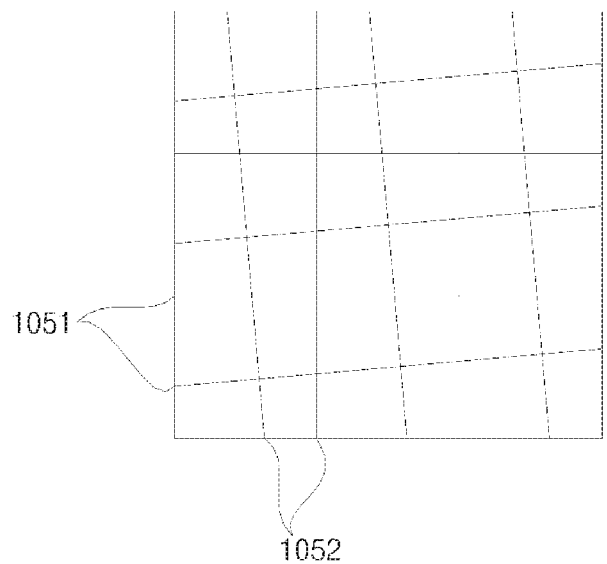

As a result, as shown in FIG. 12A, mirror surfaces 1041 and additional mirror surfaces 1042 of the micro mirror array may be formed.

Alternatively, the micro mirror array may be cut obliquely in a direction of inclination opposite to a direction of inclination in which the micro mirror array is cut, as shown in FIG. 12A, in order to form mirror surfaces 1051 and additional mirror surfaces 1052 of the micro mirror array.

Figure 12C:
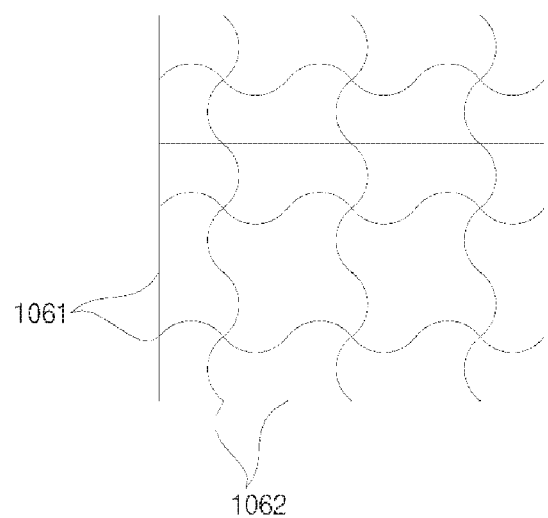
Figure 12D:
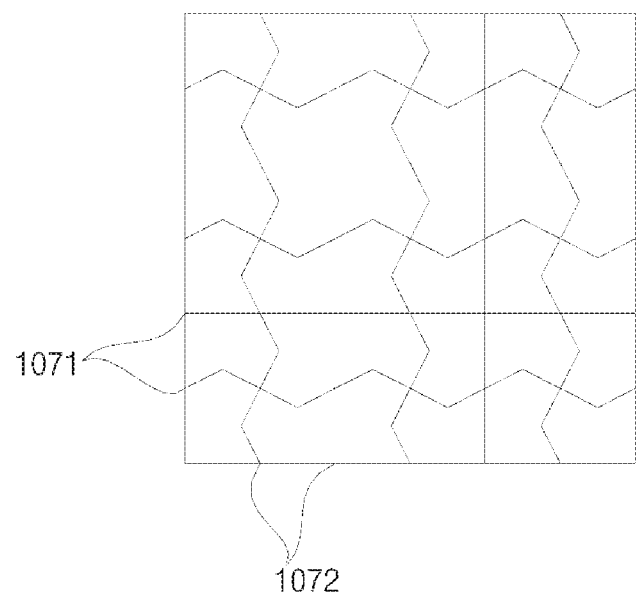

Alternatively, the micro mirror array may be cut at least once to have a wave shape, as shown in FIG. 12C, or the micro mirror array may be cut at least once to have a mountain shape, as shown in FIG. 12D, in order to form mirror surfaces 1061 and 1971 and additional mirror surfaces 1062 and 1072 of the micro mirror array.

The manufacturing method of the micro mirror array according to the embodiment of the present invention, described with reference to FIGS. 8A to 12D, is performed through well-known processes characterized by high yield, such as coating polymer films, bonding the polymer films in a stacked state, and cutting the bonded polymer films.

Consequently, it is possible to relatively easily form quadrangular mirror lattice surfaces in the micro mirror array, whereby it is possible to increase the size of the micro mirror array or to reduce the cost of manufacturing the micro mirror array.

In the micro-hole type micro mirror array of FIG. 4, it is necessary to provide a predetermined distance between neighboring ones of the micro holes in order to stably form the micro holes.

As a result, unavailable regions exist in the micro-hole type micro mirror array, and light incident upon the unavailable regions of the micro-hole type micro mirror array is not reflected, and is ultimately lost.

In addition, in the two-layer type micro mirror array of FIG. 5, the two plates are used to constitute two layers. As a result, light efficiency is reduced.

For example, in an instance in which the first layer plate has a mirror surface formed in a first direction, and light is incident upon a part of the first layer plate at which the mirror surface is not formed, the light is not reflected by the mirror surface of the first layer plate, and is ultimately lost.

In addition, in an instance in which the second layer plate has a mirror surface formed in a second direction, and light is incident upon a part of the second layer plate at which the mirror surface is not formed, the light is not reflected by the mirror surface of the second layer plate, and is ultimately lost.

In the micro mirror array according to the embodiment of the present invention, however, all regions of the micro mirror array are used without wasted regions of the micro mirror array attributable to the distance between neighboring ones of the micro holes, unlike the micro-hole type micro mirror array of FIG. 4. In addition, only a single layer is used. Consequently, the micro mirror array according to the embodiment of the present invention may have light efficiency equivalent to about two and four times those of the micro-hole type micro mirror array of FIG. 4 and the two-layer type micro mirror array of FIG. 5, respectively.

Figure 13:
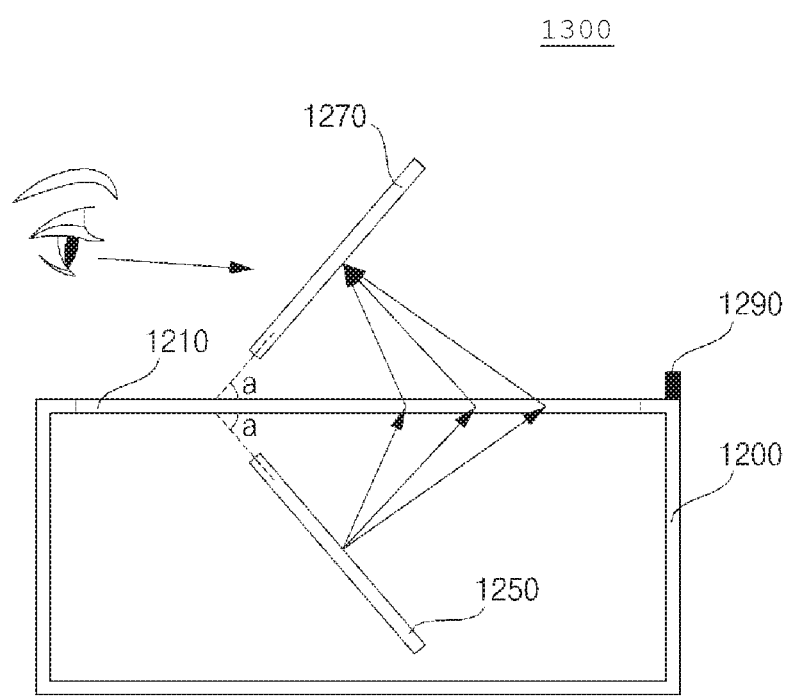
FIGS. 13 to 15 are reference views illustrating a floating display device according to another embodiment of the present invention.
Figure 14:
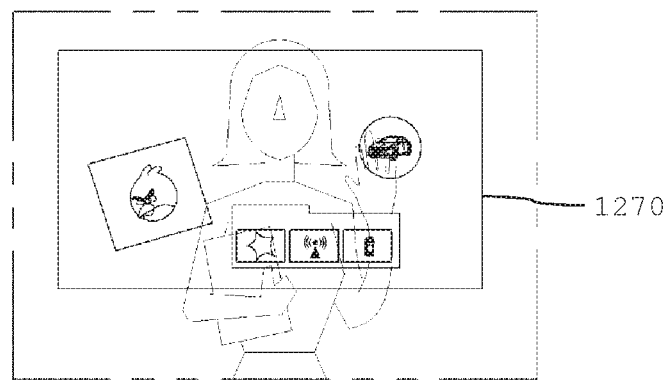
Figure 15:
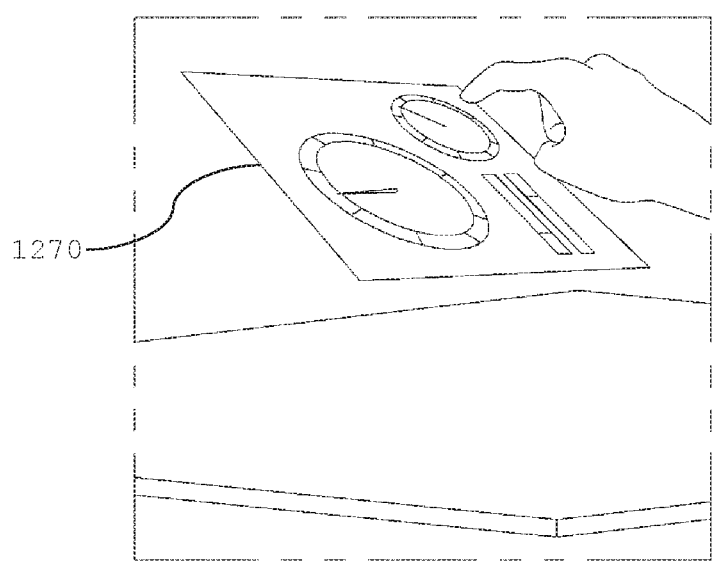

FIGS. 13 to 15 are reference views illustrating a floating display device according to another embodiment of the present invention.

Referring to FIG. 13, a floating display device 1300 according to another embodiment of the present invention may include a display unit 1250 for displaying an image and a micro mirror array 1210 for reflecting the image displayed on the display unit 1250 in a direction opposite to a direction in which the display unit 1250 is disposed. In addition, the floating display device may further include a housing 1200 for receiving the display unit 1250 and the micro mirror array 1210.

As shown in FIG. 13, the floating display device according to the embodiment of the present invention may be a table-top display device.

The micro mirror array 1210, which is disposed horizontally, may reflect an image displayed on the display unit 1250, which is disposed under the micro mirror array 1210, in a direction opposite to a direction in which the display unit 150 is disposed, i.e. upward, to form a floating image 1270.

In addition, the micro mirror array 1210 may reflect the original image displayed on the display unit 1250 to form the floating image 1270 on a virtual surface that is located symmetrically with the display unit 1250 on the basis of the micro mirror array 1210.

Meanwhile, as previously described with reference to FIGS. 6 to 11D, the micro mirror array 1210 may include a polymer film part and a plurality of mirror surfaces formed at a single layer of the polymer film part. In this instance, the mirror surfaces may be formed in the single layer of the polymer film part. In addition, the mirror surfaces may include first surfaces and second surfaces that are formed at right angles to each other.

In addition, the mirror surfaces may be arranged in a lattice arrangement, and the lattice arrangement may be constituted by a plurality of quadrangles.

Meanwhile, the polymer film part may be made of any one selected from among polycarbonate (PC), polyethylene (PE), polyethylene terephthalate (PET), polypropylene (PP), and polymethyl methacrylate (PMMA).

The floating display device according to the embodiment of the present invention may further include a motion sensor, for sensing motion of a user, or a camera 1290.

Various well-known motion sensors, such as an infrared sensor, may be used as the motion sensor according to the present invention.

The motion sensor may transmit a result of sensing the location or action of the user to an additional sensing signal processing unit, or may generate a sensing signal corresponding thereto and input the generated sensing signal to a processor of the floating display device.

The camera 1290 may capture an image of the user. The camera 1290 may be a single camera system. However, the present invention is not limited thereto. The camera 1290 may be a multiple camera system.

Meanwhile, the camera 1290 may be built in the housing 1200, or may be disposed separately from the housing 1200. Information regarding an image captured by the camera 1290 may be input to the processor of the floating display device.

The processor of the floating display device may control the operation of respective units of the floating display device to control the overall operation of the floating display device. For example, the processor of the floating display device may perform image signal processing such that an image is displayed on the display unit 1250. In addition, the processor of the floating display device may distinguish an image displayed on the display unit 1250 and graphical objects included in the image.

Meanwhile, the floating image 1270 may be formed on a virtual surface that is located symmetrically with the display unit 1250 on the basis of the micro mirror array 1210.

Consequently, the processor may distinguish a region in which the floating image 1270 will be formed or the size of the floating image 1270 based on the micro mirror array 1210 according to information regarding the size of the display unit 1250 and an angle a at which the display unit 1250 is disposed.

In addition, the processor may confirm the motion of an external user based on an image captured by the camera 1290 or data sensed or calculated by the motion sensor. For example, when a user makes a gesture, the processor may confirm the gesture of the user based on information regarding the distance that is detected.

The processor may map the distinguished location and action of the user in a region in which the floating image 1270 will be formed and an image which will be displayed to distinguish user's input with respect to the floating image 1270.

In addition, the processor may sense the touch of an object, such as a hand of the user, on the screen at a specific object or position on the floating image 1270 to perform a feedback operation corresponding to the action of the user.

Consequently, user interaction is possible.

The floating display device may sense the location, action, or gesture of the user based on a captured image, a signal sensed by the motion sensor, or a combination thereof.

Consequently, as shown in FIG. 14, the floating display device may sense the action of the user and perform an operation corresponding thereto, whereby the floating display device may interact with the user.

The floating display device according to the present invention may be used as digital signage 1400. "Digital signage" means outdoor information display devices using display units, which have been increasingly used as billboards.

Such digital signage may control information provided over a communication network, and may reciprocally communicate with the user. In addition, the digital signage may be configured to have various forms according to the purpose thereof.

The floating display device according to the embodiment of the present invention may be a micro mirror array type floating display device 1500. As shown in FIG. 15, therefore, the floating display device may be applied to table-top type information display, outdoor advertisements, non-contact type display, personal security display, etc.

Figure 16:
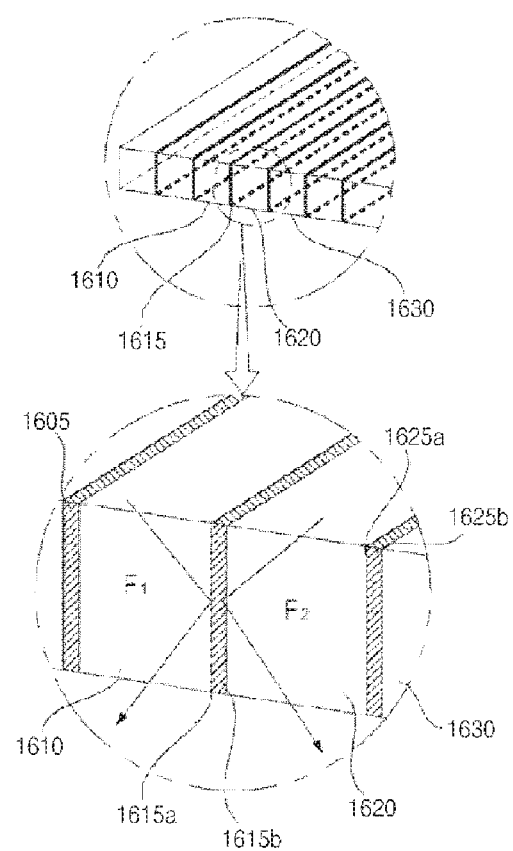
FIG. 16 is a reference view illustrating a micro mirror array.

FIG. 16 is a reference view illustrating a micro mirror array.

In the manufacturing methods of micro mirror arrays that were previously described with reference to FIGS. 8A to 12D, a plurality of polymer films, each of which is coated with aluminum (Al), may be bonded in a stacked state, and may then be cut vertically. As a result, as shown in FIG. 16, quadrangular mirror lattice surfaces are formed in a film plate.

In an instance in which one surface of each of the polymer films may be coated with a metal material, such as aluminum (Al), to form a mirror, some of the light that is incident on the mirror may not be reflected by the surface of the mirror, but may be transmitted through the mirror and may then be reflected by the surface of another mirror adjacent thereto.

As a result, an image may be blurred. In the worst instance, a double image may be formed.

Referring to FIG. 16, light may be incident upon a mirror portion 1615 having a mirror surface 1615a, which is formed on a first film layer 1610 of a transparent polymer film part, through the first film layer 1610 and/or a second film layer 1620 adjacent to the first film layer 1610.

At this time, light incident upon the mirror surface 1615a through the first film layer 1610 may not be reflected by the mirror surface 1615a, but may be transmitted to the second film layer 1620 or may be reflected by a mirror surface 1625a of the second film layer 1620.

In addition, light incident upon the mirror surface 1615a through the second film layer 1620 may not be reflected by the mirror surface 1615a, but may be transmitted to the first film layer 1610 or may be reflected by a mirror surface of another film layer adjacent thereto.

In addition, light may be incident upon the mirror surface 1625a, which is formed on the second film layer 1620 of the polymer film part, through the second film layer 1620 and/or the first film layer 1610 and a third film layer 1630 adjacent to the second film layer 1620.

When light is incident upon the mirror surface 1625a through the second film layer 1620, the light may not be reflected by the mirror surface 1625a, but may be transmitted to the third film layer 1630 or may be reflected by a mirror surface of the third film layer 1630.

In addition, light incident upon the mirror surface 1625a through the third film layer 1630 may not be reflected by the mirror surface 1625a, but may be transmitted to the second film layer 1620 or may be reflected by the mirror surface 1615a of the first film layer 1610 adjacent thereto. Also disclosed in FIG. 16 is another film layer 1605 having the same structure as the first film layer 1610, for example, and the discussion of which is omitted as redundant.

Meanwhile, in an instance in which the thickness of a metal material, such as aluminum (Al), with which each polymer film is coated in order to increase reflectance, is increased, it is difficult to achieve uniformity of the coated surface. As a result, the coated surface may be stained, which may lead to the reduction of yield.

Even in an instance in which uniform coating is achieved, the coated surface may be easily broken.

In addition, light may be incorrectly reflected by adhesive layers 1615b and 1625b due to an adhesive used for bonding.

Figure 17:
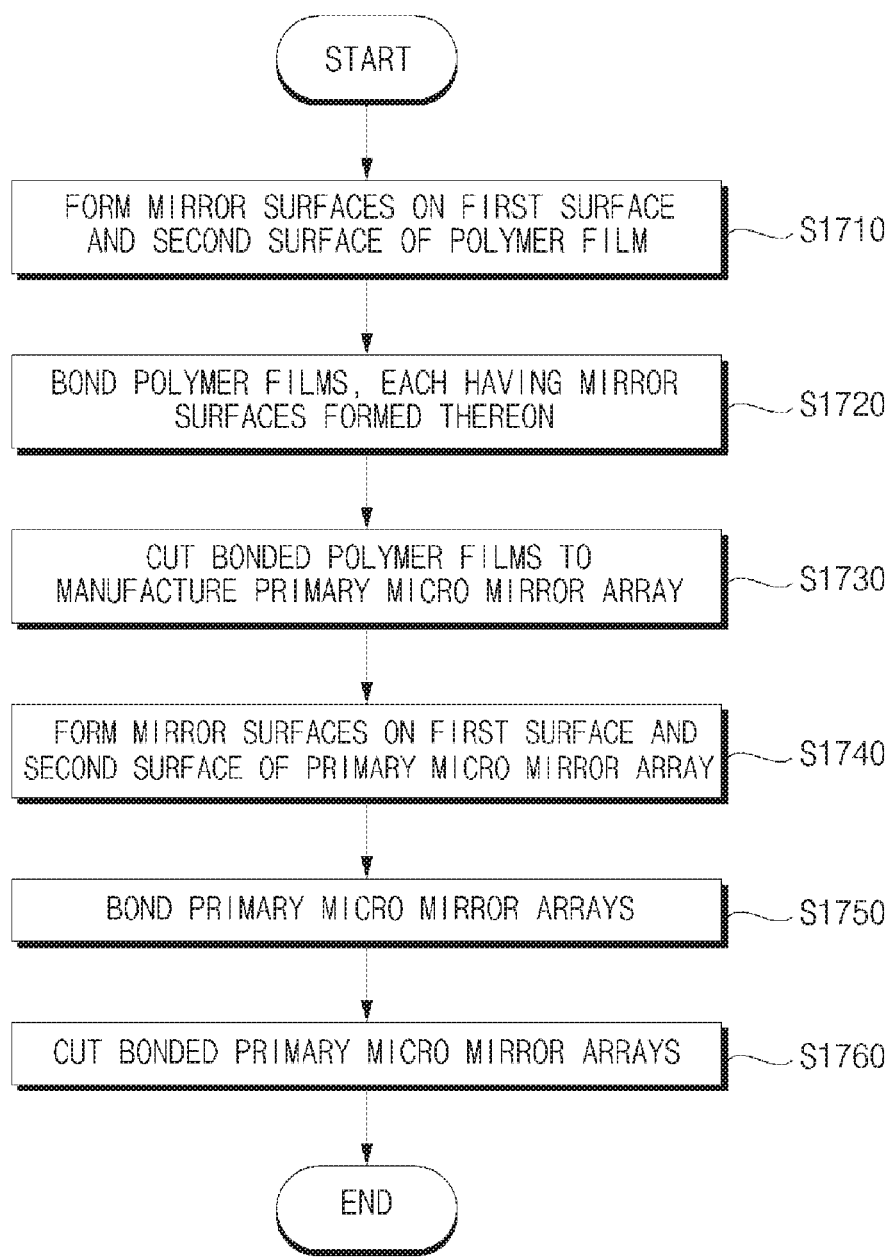
FIG. 17 is a flowchart showing a manufacturing method of a micro mirror array according to an embodiment of the present invention.

FIG. 17 is a flowchart showing a manufacturing method of a micro mirror array according to an embodiment of the present invention.

FIGS. 18 to 22 are reference views illustrating the manufacturing method of the micro mirror array according to the embodiment of the present invention.

Figure 23:
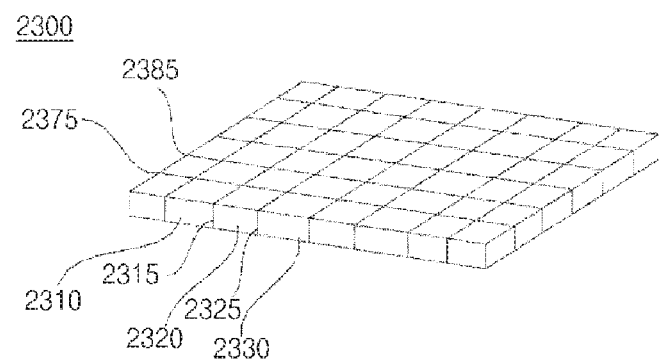
FIG. 23 is an example view showing a micro mirror array according to an embodiment of the present invention.
Figure 24:
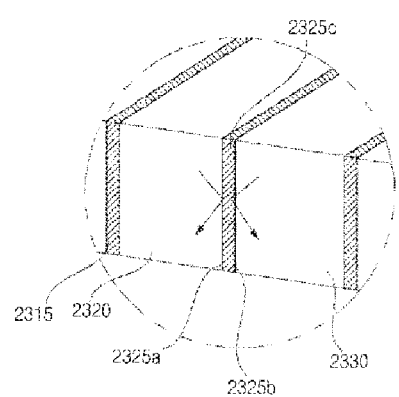
FIG. 24 is a partially enlarged view of the micro mirror array shown in FIG. 23.

FIG. 23 is an example view showing a micro mirror array according to an embodiment of the present invention, and FIG. 24 is a partially enlarged view of the micro mirror array shown in FIG. 23.

Figure 18:
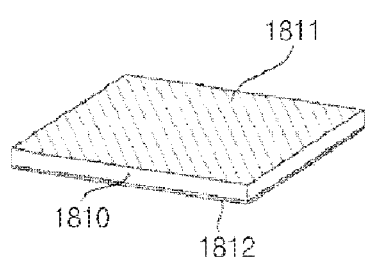
FIGS. 18 to 22 are reference views illustrating the manufacturing method of the micro mirror array according to the embodiment of the present invention.

Referring to the figures, mirror surfaces 1811 and 1812 may be first formed on a first surface and a second surface of a polymer film 1810, as shown in FIG. 18 (S1710).

The polymer film 1810 may be named a unit polymer film.

The first surface and the second surface may be two opposite surfaces of the polymer film 1810.

That is, according to the embodiment of the present invention, mirror surfaces may be formed on the opposite surfaces of the polymer film.

Meanwhile, the polymer film may be any one selected from among polycarbonate (PC), polyethylene (PE), polyethylene terephthalate (PET), polypropylene (PP), and polymethyl methacrylate (PMMA). Alternatively, other transparent polymer films may be used.

In addition, at the step of forming the mirror surfaces (S1710), the polymer film 1810 may be coated with a metal material in order to form the mirror surfaces 1811 and 1812.

Meanwhile, a material exhibiting high reflectance may be used as the metal material. For example, the metal material may be any one selected from among aluminum, lead, silver, zinc, and tin.

According to the embodiment of the present invention, the opposite surfaces of the polymer film may be coated with a metal material, such as aluminum (Al), to form the mirror surfaces. In this instance, reflectance is increased, whereby it is possible to reduce image sticking or image blurring, as compared with an instance in which a mirror surface is formed on one surface of the polymer film.

In addition, according to another embodiment of the present invention, afterglow light absorption layers 1911 and 1912 may be further formed on the mirror surfaces 1811 and 1812 of the polymer film 1810.

Figure 19:
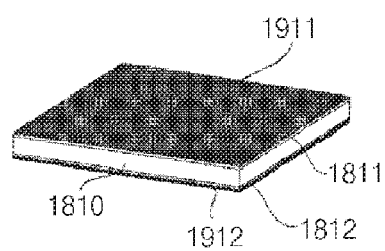

Referring to FIG. 19, the mirror surfaces 1811 and 1812 of the polymer film 1810 may be coated with an afterglow light absorption material. For example, the mirror surfaces 1811 and 1812 of the polymer film 1810 may be coated with black materials 1911 and 1912.

As a result, it is possible to prevent light from being incorrectly reflected by adhesive layers due to an adhesive used for bonding.

That is, in the embodiment of the present invention, when manufacturing a unit film, the mirror surfaces may be coated with black-colored layers to absorb light having passed through metal layers and thus to remove an image signal that causes image sticking or image blurring.

For a micro mirror array manufactured through the above-described processes, it is possible to prevent image deterioration, which may be caused due to low reflectance of the mirrors.

Figure 20:
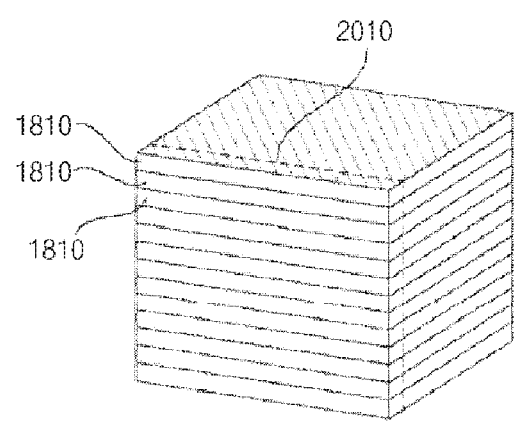

Referring to FIG. 20, a plurality of polymer films 1810, each of which has the mirror surfaces 1811 and 1812 formed thereon, may be bonded to each other (S1720). For example, the polymer films 1810, each of the opposite surfaces of which are coated with aluminum (Al), may be bonded in a stacked state.

Meanwhile, the polymer films 1810, each of which has the mirror surfaces 1811 and 1812 formed thereon, may be bonded by optical bonding.

During bonding, air gaps may be generated between the respective polymer films. The air gaps may reflect incident light, whereby the optical properties of the light may be lost or distorted.

For this reason, the polymer films 1810 are bonded by optical bonding in order to prevent the loss of light or distortion in optical properties thereof, which may be caused during bonding.

In the present invention, various optical bonding methods that are currently being studied may be used. In an example, an optical bonding resin may be applied to one polymer film 1810, a pattern may be formed on the optical bonding resin, the optical bonding resin may be cured using ultraviolet light or heat, and the polymer film 1810 may be bonded to another polymer film.

Figure 21:
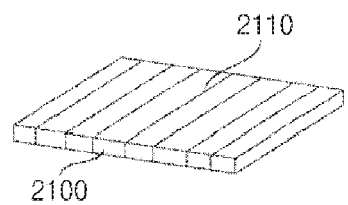

Referring to FIG. 20, the bonded polymer films 1810 may be cut along a cutting line 2010. As a result, as shown in FIG. 21, a primary micro mirror array 2100 may be manufactured (S1730).

In one example, the bonded polymer films 1810 may be cut perpendicularly along cutting line 2010 so as to manufacture the primary micro mirror array 2100. In an instance in which a plurality of primary micro mirror arrays 2100 is manufactured by repetitive perpendicular cutting, all of the manufactured primary micro mirror arrays 2100 may have the same shape.

Meanwhile, each of the manufactured primary micro mirror arrays 2100 may include a stripe type mirror surface 2110 therein. Alternatively, each of the manufactured primary micro mirror arrays 2100 may include a stripe type mirror surface and an afterglow light absorption layer therein.

Meanwhile, a first surface and a second surface of each of the manufactured primary micro mirror arrays 2100 may be coated with a metal material to form additional mirror surfaces (S1740). For example, each of the additional mirror surfaces may be formed on a perpendicularly cut surface of each of the primary micro mirror arrays 2100, which is cut along a corresponding one of the cutting lines 2010, or on the surface of each of the primary micro mirror arrays 2100 that is opposite to the perpendicularly cut surface.

Meanwhile, the first surface and the second surface may be two opposite surfaces of each of the primary micro mirror arrays 2100.

That is, according to the embodiment of the present invention, additional mirror surfaces may be formed on the opposite surfaces of each of the primary micro mirror arrays 2100.

In addition, according to another embodiment of the present invention, afterglow light absorption layers may be further formed on additional mirror surfaces of each of the primary micro mirror arrays 2100. For example, the additional mirror surfaces of each of the primary micro mirror arrays 2100 may be coated with black materials to form afterglow light absorption layers.

According to the embodiment of the present invention, the opposite surfaces of each of the primary micro mirror arrays 2100 may be coated with a metal material, such as aluminum (Al), to form mirror surfaces. In this instance, reflectance is increased, whereby it is possible to primarily reduce image sticking or image blurring, as compared with an instance in which a mirror surface is formed on one surface of each of the primary micro mirror arrays 2100.

Figure 22:
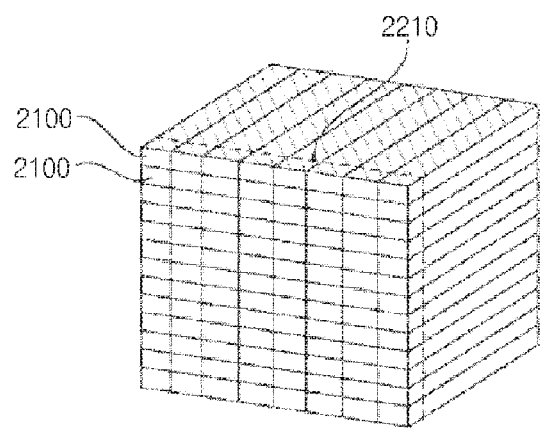

Meanwhile, as shown in FIG. 22, the primary micro mirror arrays 2100, each of which has additional mirror surfaces formed thereon, may be bonded to each other (S1750).

For example, the opposite surfaces of each of the primary micro mirror arrays 2100 are coated with aluminum (Al), and then the primary micro mirror arrays 2100, the opposite surfaces of each of which are coated with aluminum (Al), may be bonded in a stacked state.

Even in this instance, the primary micro mirror arrays 2100, each of which has the additional mirror surfaces formed thereon, may be bonded by optical bonding.

Referring to FIGS. 22 and 23, the bonded primary micro mirror arrays 2100 may be cut along a cutting line 2210 to finally manufacture a micro mirror array 2300 (S1760).

In one example, the bonded primary micro mirror arrays 2100 may be cut perpendicularly along the cutting line 2210 to finally manufacture a micro mirror array 2300.

The manufacturing method of the micro mirror array according to the embodiment of the present invention, described with reference to FIGS. 18 to 23, is performed through well-known processes characterized by high yield, such as coating polymer films, bonding the polymer films in a stacked state, and cutting the bonded polymer films.

Consequently, it is possible to relatively easily form quadrangular mirror lattice surfaces in the micro mirror array, whereby it is possible to increase the size of the micro mirror array or to reduce the cost of manufacturing the micro mirror array.

In the micro-hole type micro mirror array of FIG. 4, it is necessary to provide a predetermined distance between neighboring ones of the micro holes in order to stably form the micro holes.

As a result, unavailable regions exist in the micro-hole type micro mirror array, and light incident upon the unavailable regions of the micro-hole type micro mirror array is not reflected, and is ultimately lost.

In the micro mirror array according to the embodiment of the present invention, however, all regions of the micro mirror array are used without wasted regions of the micro mirror array attributable to the distance between neighboring ones of the micro holes. In addition, only a single layer is used. Consequently, light efficiency is improved.

FIG. 23 is an example view showing a micro mirror array according to an embodiment of the present invention, and FIG. 24 is a partially enlarged view of the micro mirror array shown in FIG. 23.

Referring to the figures, a micro mirror array 2300 according to an embodiment of the present invention may include stripe type mirror surfaces 2315, 2325, 2375, and 2385 therein. Alternatively, the micro mirror array 2300 may include stripe type mirror surfaces 2325a and 2325b and an afterglow light absorption layer 2325c therein.

Meanwhile, in the present invention, mirror surfaces are formed on opposite surfaces of a polymer film or a primary micro mirror array.

As a result, mirror surfaces may be formed on opposite surfaces of each of first to third film layers 2310, 2320, and 2330.

In addition, according to another embodiment of the present invention, an afterglow light absorption layer 2325c may be further included between a mirror surface 2325a of a specific film layer, e.g. the film layer 2320, and a mirror surface 2325b of the film layer 2330, which is adjacent to the film layer 2320.

Consequently, only light passing through the second film layer 2320, which constitutes a transparent polymer film part, is incident upon the mirror surface 2325a formed on the second film layer 2320.

Light may not be incident upon the mirror surface 2325a formed on the second film layer 2320 through the third film layer 2330.

Light passing through the third film layer 2330 may be reflected by the mirror surface 2325b formed on the third film layer 2330.

In addition, even when a small amount of light passes through the mirror surface 2325b formed on the third film layer 2330, the light may be absorbed by the afterglow light absorption layer 2325c.

According to the embodiment of the present invention, mirror surfaces are formed on opposite surfaces of a polymer film or a primary micro mirror array. Consequently, reflectance is increased, whereby it is possible to reduce image sticking or image blurring, as compared with an instance in which a mirror surface is formed on one surface of the polymer film or the primary micro mirror array.

A floating display device according to an embodiment of the present invention may include the micro mirror array that was described with reference to FIGS. 17 to 24.

In the floating display device according to the embodiment of the present invention, a real image is formed in space. As a result, the image is highly realistic, and exhibits a high cubic or 3D effect even though the image is 2D. In addition, the floating display device according to the embodiment of the present invention may be applied to a digital signage, a table-top display, etc.

In addition, the image is a front floating image, which may interact with the user.

Constructions and methods of the embodiments as previously described are not limited to the micro mirror array, the manufacturing method of the micro mirror array, and the floating display device including the micro mirror array according to the present invention. All or some of the embodiments may be selectively combined so that the embodiments can be variously modified.

As is apparent from the above description, according to at least one of the embodiments of the present invention, it is possible to manufacture a micro mirror array that exhibits high light efficiency at high yield and low cost.

In addition, according to at least one of the embodiments of the present invention, it is possible to provide a floating display device that is capable of displaying an image that is highly realistic and exhibits a high cubic or 3D effect.

In addition, according to at least one of the embodiments of the present invention, it is possible to provide a floating display device that is capable of interacting with a user.

Various other effects of the present invention have been directly or suggestively disclosed in the detailed description of the invention.

It will be apparent that, although the example embodiments have been shown and described above, the present invention is not limited to the above-described specific embodiments, and various modifications and variations can be made by those skilled in the art without departing from the gist of the appended claims. Thus, it is intended that the modifications and variations should not be understood independently of the technical spirit or prospect of the present invention.

What is claimed is:

1. A manufacturing method of a micro mirror array comprising:
   forming a mirror surface on a polymer film;
   forming an afterglow light absorption layer on the mirror surface;
   bonding a plurality of polymer films, each having the mirror surface formed thereon;
   cutting the bonded polymer films to manufacture a primary micro mirror array;
   forming an additional mirror surface on the manufactured primary micro mirror array;
   forming the afterglow light absorption layer on the additional mirror surface;
   bonding a plurality of primary micro mirror arrays, each having the additional mirror surface formed thereon; and
   cutting the bonded primary micro mirror arrays.

2. The manufacturing method according to claim 1, wherein the forming of the mirror surface on the polymer film comprises coating the polymer film with a metal material to form the mirror surface.

3. The manufacturing method according to claim 2, wherein the metal material is any one selected from among aluminum, lead, silver, zinc, and tin.

4. The manufacturing method according to claim 1, wherein the polymer film is any one selected from among polycarbonate (PC), polyethylene (PE), polyethylene terephthalate (PET), polypropylene (PP), and polymethyl methacrylate (PMMA).

5. The manufacturing method according to claim 1, wherein the manufacturing of the primary micro mirror array comprises perpendicularly cutting the bonded polymer films to manufacture the primary micro mirror array.

6. The manufacturing method according to claim 1, wherein the bonding of the polymer films, each having the mirror surface formed thereon, comprises bonding the polymer films, each having the mirror surface formed thereon, by optical bonding.

7. The manufacturing method according to claim 1, wherein the forming of the mirror surface comprises forming mirror surfaces on a first surface and a second surface of the polymer film.

8. A micro mirror array comprising:
a polymer film part;
a plurality of mirror surfaces formed in one layer of the polymer film part; and
afterglow light absorption layers on the mirror surfaces, wherein the mirror surfaces are arranged in a lattice arrangement.

9. The micro mirror array according to claim 8, wherein the mirror surfaces comprise first surfaces and second surfaces that are perpendicular to each other.

10. The micro mirror array according to claim 8, wherein the lattice arrangement is constituted by a plurality of quadrangles.

11. The micro mirror array according to claim 8, wherein the polymer film part is formed to have a single layer.

12. The micro mirror array according to claim 8, wherein the polymer film part is made of any one selected from among polycarbonate (PC), polyethylene (PE), polyethylene terephthalate (PET), polypropylene (PP), and polymethyl methacrylate (PMMA).

13. The micro mirror array according to claim 8, wherein the polymer film part comprises a plurality of unit polymer films, each having mirror surfaces formed on opposite surfaces thereof.

14. A floating display device comprising:
a display unit for displaying an image; and
a micro mirror array for reflecting an original image displayed on the display unit to form a floating image on a virtual surface that is located symmetrically with the display unit on a basis of the micro mirror array,
wherein the micro mirror array comprises a polymer film part, a plurality of mirror surfaces formed in one layer of the polymer film part and afterglow light absorption layers on the mirror surfaces.

15. The floating display device according to claim 14, wherein the mirror surfaces are arranged in a lattice arrangement.

16. The floating display device according to claim 15, wherein the lattice arrangement is constituted by a plurality of quadrangles.

17. The floating display device according to claim 14, wherein the mirror surfaces comprise first surfaces and second surfaces that are perpendicular to each other.

18. The floating display device according to claim 14, wherein the polymer film part is made of any one selected from among polycarbonate (PC), polyethylene (PE), polyethylene terephthalate (PET), polypropylene (PP), and polymethyl methacrylate (PMMA).

19. The floating display device according to claim 14, further comprising a motion sensor for sensing motion of a user or a camera.

20. The floating display device according to claim 14, wherein the polymer film part comprises a plurality of unit polymer films, each having mirror surfaces formed on opposite surfaces thereof.

* * * * *